United States Patent [19]
Janniello et al.

[11] Patent Number: 5,253,274
[45] Date of Patent: Oct. 12, 1993

[54] MEANS TO DIFFERENTIATE BETWEEN COMMANDS AND DATA ON A COMMUNICATIONS LINK

[75] Inventors: Frank J. Janniello, Stamford, Conn.; Rajiv Ramaswami, East White Plains, N.Y.; David G. Steinberg, Stamford, Conn.

[73] Assignee: International Business Machines Corporation, Armonk, N.Y.

[21] Appl. No.: 869,557

[22] Filed: Apr. 15, 1992

[51] Int. Cl.$^5$ .............................................. H04B 25/49
[52] U.S. Cl. ..................................... 375/121; 370/111
[58] Field of Search ............... 379/93, 97, 98; 370/77, 370/80, 106, 110.1, 111; 375/5, 121; 340/825.06, 825.44, 825.62

[56] References Cited
U.S. PATENT DOCUMENTS

| | | | |
|---|---|---|---|
| 4,689,790 | 8/1987 | Lacroix et al. | 370/111 |
| 4,805,194 | 2/1989 | Weslowski | 375/121 |
| 4,926,448 | 5/1990 | Kraul et al. | 375/121 |

Primary Examiner—Benedict V. Safourek
Attorney, Agent, or Firm—Douglas W. Cameron

[57] ABSTRACT

A method of transmitting data and commands on a communication link so as to efficiently distinguish between commands and data. This invention encodes information symbols before transmission on the communication link. A unique code symbol S which does not equal any encoded information symbol is defined along with a unique encoded command symbol ESOTX. Encoded data information symbols are transmitted by sending S followed by ESOTX, and then the encoded data information symbols. Encoded command information symbols, not including ESOTX, are transmitted by sending S immediately followed by the encoded command information symbols. The receiver interprets any encoded information symbol immediately following S as a command. If the encoded command equals ESOTX, the following symbols are treated as data until S is received again. If the encoded command is not ESOTX, the following symbols are treated as commands until S is received again.

2 Claims, 2 Drawing Sheets

MEANS TO DIFFERENTIATE BETWEEN COMMANDS AND DATA ON A COMMUNICATIONS LINK

TECHNICAL FIELD

This invention relates to a method and apparatus for distinguishing between commands and data on a communications link of a communications system.

PRIOR ART

In communication links, both data and command information are transmitted. The transmitter combines data and commands in some prescribed fashion and these must then be separated at the receiver. The problem is to find an efficient method for distinguishing between commands and data.

Prior art solves this problem in several ways. One common approach is bit stuffing (as in the International Standard Organization's HDLC standard, see for example, D. E. Carlson, Bit-oriented data link control procedures, IEEE Transactions on Communications, pp. 455–467, 1980), which applies to serial transmission of binary data. Here, a certain sequence is always interpreted as a delimiter. Since data can be arbitrary, whenever a binary data sequence identical to the delimiter sequence is to be transmitted, the transmitter modifies the sequence to avoid ambiguity. For example, if the sequence 111111 signifies a delimiter, then whenever we have to transmit a data sequence 11111, followed by any another sequence of bits, we stuff a 0 between the 5th and 6th bits. Thus, a data sequence 01111110 would be transmitted as 011111010 and a data sequence 01111100 would be transmitted as 011111000. The receiver then "unstuffs" the received sequence. In this example, when the receiver sees the sequence 11111 followed by a 0, it automatically discards the 0. When it sees the sequence 111111 before the unstuffing operation, it is interpreted as a delimiter. The problem with this approach is that the number of bits transmitted depends on the values of the data and cannot be predicted a priori.

Yet another approach is to encode k-bit data words into n-bit code words before transmission, where $n > k$. This is a common technique used in the fiber-distributed data interface (FDDI), (F. E. Ross, FDDI-a tutorial, IEEE Communications Magazine, May 1986, pp.10–17), the Enterprise Systems Connection serial channel (ESCON) (C. J. Georgiou et al., The ESCON director: a dynamic switch for 200-Mbits/sec fiber-optic links, IBM Journal of Research and Development, 1992), and the fibre channel standard (FCS) (American National Standards Institute, Fibre Channel: Physical and Signaling Interface, Rev. 2.2, 1992). The above encoding technique provides not only a way to differentiate between commands and data but also provides a means to maintain DC balance and guarantees sufficient transitions to enable the receiver to maintain bit synchronization. Since there are $2^{n-k}$ code words which do not have corresponding data words, these can be used as commands. This is the case with FDDI, ESCON and FCS. In many situations however, these $2^{n-k}$ code words may not be available to be used as commands. Even if they are available, many of them if used, could result in DC imbalances as well as lack of transitions.

Another approach is to precede blocks of data with headers that contain command information see, for example, U.S. Pat. No. 4,594,708 to M. Servel et al. This approach is inefficient for small block sizes because of the fixed overhead per block. On the other hand, long data blocks may be undesirable due to buffer limitations or long error recovery times. Moreover, this approach does not allow interjection of commands in the middle of a long data block.

U.S. Pat. No. 4,512,026 to Vander Meiden discloses the use of a unique value as a delimiter between commands and data. Vander Meiden does not use encoding and prevents data words from having this unique delimiter value by the use of bit stuffing.

U.S. Pat. No. 4,606,056 to Perloff requires 2 bits in each word in order to differentiate between a command word and a data word. Thus, there is a fixed overhead per word, which is inefficient.

U.S. Pat. No. 4,860,286 to Forsberg et al. applies to multiplexed transmission on a serial link. N inputs are over sampled at a fixed rate producing 2 kN samples. Of these, kN samples are sent using positive logic, followed by a fixed-length sync word, followed by the remaining kN samples using negative logic. Since the data's polarity is periodic, frame boundaries can be detected. No block encoding is used.

U.S. Pat. No. 5,012,489 to Burton et al. uses many special characters as commands and does not use a unique code symbol to delimit between data and commands.

U.S. Pat. No. 5,060,229 to Tyrrell et al. describes the use of fixed-length frames and a fixed header at the beginning of the frame for commands. This approach is inefficient for small block sizes because of the fixed overhead per block. On the other hand, long data blocks may be undesirable due to buffer limitations or long error recovery times. Moreover, this approach does not allow interjection of commands in the middle of a long data block.

SUMMARY OF THE INVENTION

It is therefore an object of this invention to differentiate between commands and data while requiring minimum bandwidth, providing dc balance and sufficient bit transitions for the receiver to maintain bit synchronization, and not requiring bit stuffing. Furthermore, data may arrive at the transmitter in bursts with idle periods in between. After an idle period, the receiver must be able to determine when the link becomes active again.

Accordingly, this invention provides a method of transmitting a stream of information symbols so that data information symbols can be easily distinguished from command information symbols.

Information symbols in a set D, representing data or commands to be transmitted are first encoded into a larger set E of code symbols. An encoded information symbol may either be interpreted as a data symbol or a command symbol, depending on the context as explained below.

One code symbol, S, in E, which does not represent an information symbol in D, is used to delimit between commands and data. When the transmitter wishes to send a command, it first transmits the delimiter S, followed by the encoded command. When the transmitter wishes to send data, it first transmits the delimiter S, followed by a command representing Start-Of-Text, followed by the encoded data. At the receiver, whenever S is received, the receiver awaits the arrival of the first symbol that is not S. This non-S symbol is interpreted as representing a command. Whenever the Start-of-Text command is received, all succeeding symbols are interpreted as data until S is received again. This Start-Of-Text is also used to inform the receiver that the transmitter has transitioned from an idle state to a state where data is transmitted. After leaving its idle state, the transmitter automatically inserts a Start-of-Text after an S symbol before it begins transmitting data.

DESCRIPTION OF THE PREFERRED EMBODIMENT

In the preferred embodiment, there is a transmitter and receiver which perform the following functions.

At the transmitter, a binary information word consisting of 8 bits is encoded into a code word of 10 bits using a block 8-10 code (for example, A. X. Widmer and P. A. Franaszek, A DC-balanced, partitioned-block 8B/10B transmission code, IBM Journal of Research and Development, vol. 27, no. 5, September 1983, pp. 410-451), which is hereby incorporated by reference. One 10-bit code word, S, that does not correspond to an 8-bit information word is used as a delimiter.

Figure 1:
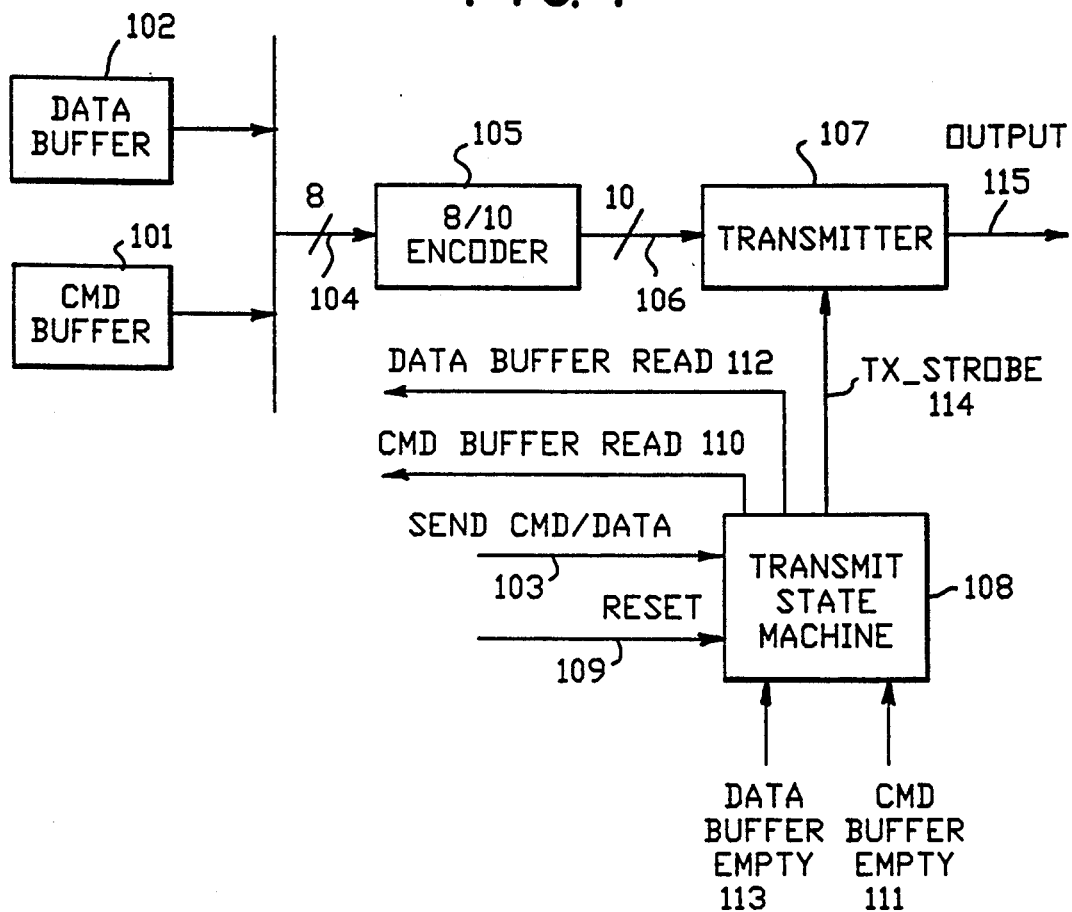
FIG. 1 is a block diagram of the transmitter apparatus.

A block diagram of the transmitter apparatus is shown in FIG. 1. The transmitter takes its input from one of two buffers, a command buffer (101) or a data buffer (102), as determined by the send cmd/data signal (103). The 8-bit input (104) is first encoded into 10-bits by the 8-10 encoder (105). The 10-bit output (106) is then sent out by the transmitter (107), according to the sequence dictated by the transmit state machine (108).

Figure 2:
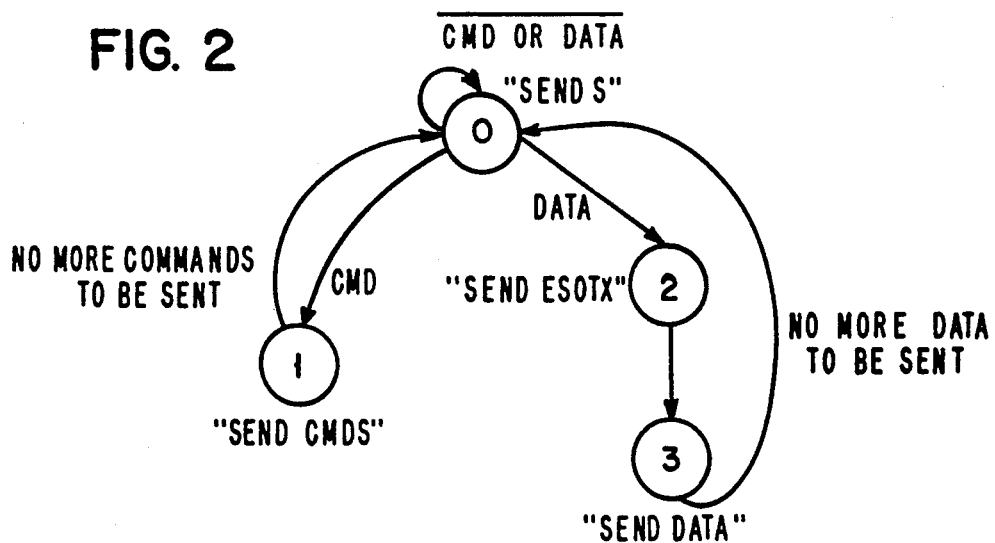
FIG. 2 illustrates the state diagram for the transmit state machine.

The transmitter operates according to the state diagram shown in FIG. 2. The transmitter is first initialized to state 0 using the reset signal (109). In state 0, the transmitter continually transmits the code word S, i.e., the sequence SSSSSSS ... When command words are to be sent, the transmitter transitions to state 1 where it issues command buffer reads (110), and transmits the encoded command words. When the transmit state machine receives a command buffer empty signal (111), it transitions to state 0 where at least one S word is transmitted before making another transition.

When data words are to be transmitted, the transmitter transitions to state 2, where it sends a 10-bit encoded word, ESOTX (encoded Start-of-Text), corresponding to a specific 8-bit command word, SOTX (Start-of-Text). It then transitions to state 3, where it issues data buffer reads (112) and transmits data continuously until it receives a data buffer empty signal (113). It then returns to state 0 where it transmits at least one S word before making another transition.

The TX_STROBE signal (114) informs the transmitter that it should send the next 10-bit word to its output (115).

Figure 3:
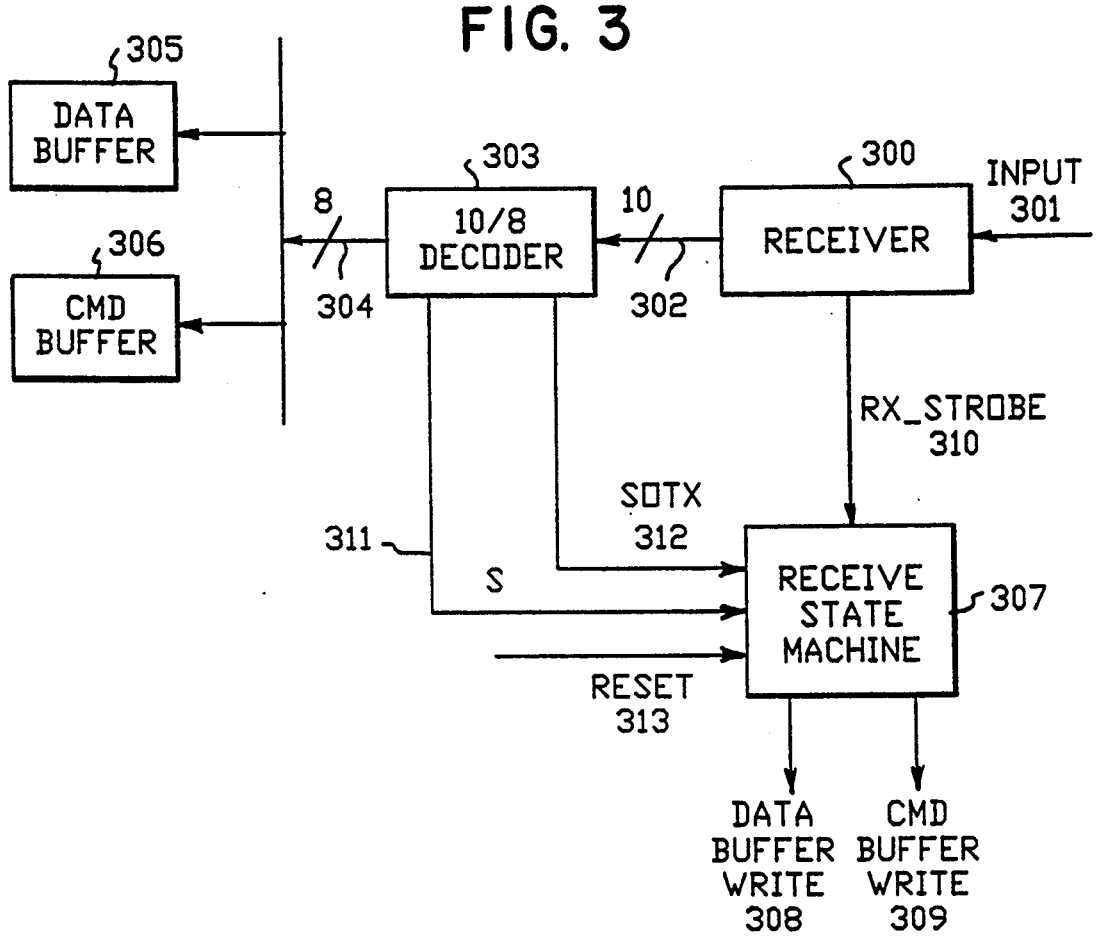
FIG. 3 is a block diagram of the receiver apparatus.

A block diagram of the receiver apparatus is shown in FIG. 3. The receiver (300) takes its input (301) and outputs 10-bit words (302) to the 10/8 decoder (303). The decoder outputs 8-bit words (304) which are stored in the data buffer (305) or the command buffer (306) as determined by the receive state machine (307) using the data buffer write (308) or command buffer write (309) signals. Each time a new 10-bit word is outputted by the receiver, it informs the receive state machine by means of the RX_STROBE signal (310). Whenever an S word is received, the decoder notifies the state machine by means of the S signal (311). Whenever an ESOTX word is received, the decoder notifies the state machine by means of the SOTX signal (312).

Figure 4:
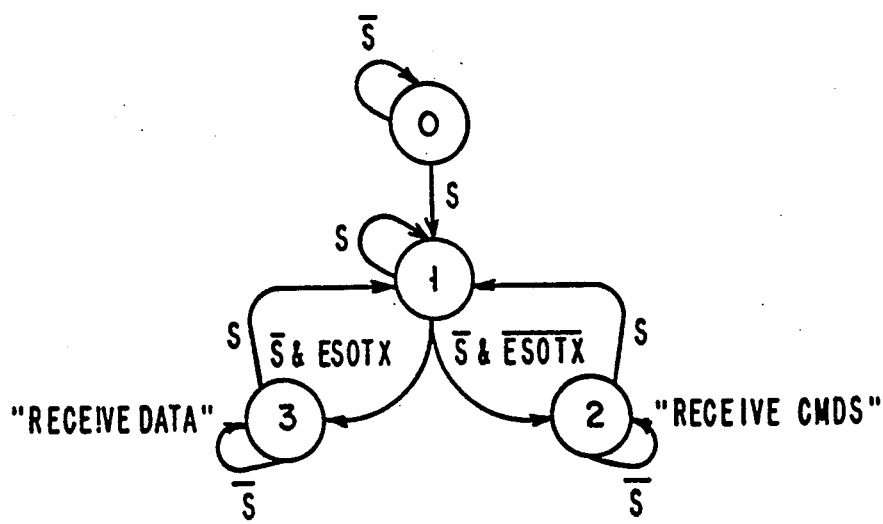
FIG. 4 illustrates the state diagram for the receive state machine.

The receive state machine operates according to the state diagram shown in FIG. 4. The receiver is initialized to state 0 by the reset signal (313) and remains there until an S word is received. It then transitions to state 1 and remains there as long as S words continue to be received. Upon receiving a word different from S and different from ESOTX, it transitions to state 2 where the word is treated as a command. Successive words are treated as command words until the next S is received, where upon the receiver transitions back to state 0. In state 1, upon receiving a word different from S and equal to ESOTX, the ESOTX is discarded and the receiver transitions to state 3. In state 3, subsequent words are treated as data until another S is received upon which the receiver transitions back to state 0.

The transmitter and receiver can be implemented in hardware using standard chip-sets such as TAXI (manufactured by Advanced Micro Devices) or HOTROD (manufactured by Gazelle) for the encoding and decoding, along with standard programmable logic for the state machines.

In this preferred embodiment, D is the set of all 8-bit words and E is the set of all 10-bit words. With the Widmer/Franaszek code, the data word 01011100 is encoded as 0011100101. The code word 0011111010 has no corresponding data word and hence can be used as the delimiter S. Start-of-Text, for example, may be 00111010 and its encoded version, ESOTX is 0101101001, A few sample sequences are shown below. The data words d1 d2 d3 ... d20 (encoded as e1 e2 e3 ... e20) may be transmitted in the following equivalent ways.

(1) S S S S ESOTX e1 e2 e3 ... e20 S S S,
(2) S ESOTX e1 e2 e3 e4 S S S ESOTX e5 e6 e7 ... e20 S.

The command words d1 d2 (encoded as e1 e2) may be transmitted in the following equivalent ways:

(1) S e1 e2,
(2) S e1 S e2.

The command word d (encoded as e) followed by data words d1 d2 ... d20 (encoded as e1 e2 ... e20) can be transmitted as S e S ESOTX e1 e2 ... e20.

Having thus described our invention, what we claim as new, and desire to secure by Letters Patent is:

1. In a communications link of a communications system, a method of transmitting a stream of information symbols, some of which are commands and some of which symbols are data, where said commands can be distinguished from said data, said method comprising:
 (a) mapping each symbol d belonging to a set D of information symbols, into a unique representation e belonging to a larger set E of code symbols;
 (b) defining a unique code symbol S in E such that no symbol in D is mapped to S;
 (c) defining a code symbol ESOTX in E wherein ESOTX is mapped from a data symbol SOTX in D;
 (d) transmitting on said link a sequence of code symbols in E mapped from data information symbols in D as in step (a) only after transmitting a combination of said S immediately followed by ESOTX, where ESOTX is interpreted as an encoded data symbol if it is not immediately preceded by S;

(e) transmitting on said link immediately after transmission of S a sequence of code symbols in E mapped from command information symbols in D as in step (a);

(f) upon receiving from said link a code symbol S followed by a code symbol X, which is mapped from the set of information symbols D:

if X≠ESOTX, interpreting X and subsequent mapped code symbols as mapped commands until S is received; if X=ESOTX, interpreting subsequent mapped code symbols as mapped data information symbols until S is received.

2. In a communications link of a communications system, an apparatus for transmitting a stream of information symbols, some of which symbols are commands and some of which symbols are data, where said commands can be distinguished from said data, said apparatus comprising:

(a) means for mapping each symbol d belonging to a set D of information symbols, into a unique representation e belonging to a larger set E of code symbols, where E has at least one symbol S which cannot be mapped from a symbol in D;

(b) means for transmitting on said link a sequence of code symbols in E mapped from data information symbols in D as in step (a) only after transmitting a combination of said S immediately followed by a code symbol ESOTX, where ESOTX is mapped from a symbol SOTX in D, where ESOTX is interpreted as an encoded data symbol SOTX if it is not immediately preceded by S;

(c) means for transmitting on said link immediately after transmission of S a sequence of code symbols in E mapped from command information symbols in D as in step (a), where ESOTX is not a first symbol of latter said sequence to be transmitted;

(d) means for, upon receiving from said link a code symbol S followed by a code symbol X, which is mapped from the set of information symbols D:

if X≠ESOTX, interpreting X and subsequent mapped code symbols as mapped commands until S is received; if X=ESOTX, interpreting subsequent mapped code symbols as mapped data information symbols until S is received.

* * * * *